June 16, 1942.   J. O. PARR, JR   2,286,567
SEISMIC SURVEYING
Filed Sept. 12, 1940   2 Sheets-Sheet 1

Inventor
Josephus O. Parr, Jr.
By Watson, Cole, Grindle & Watson
Attorney

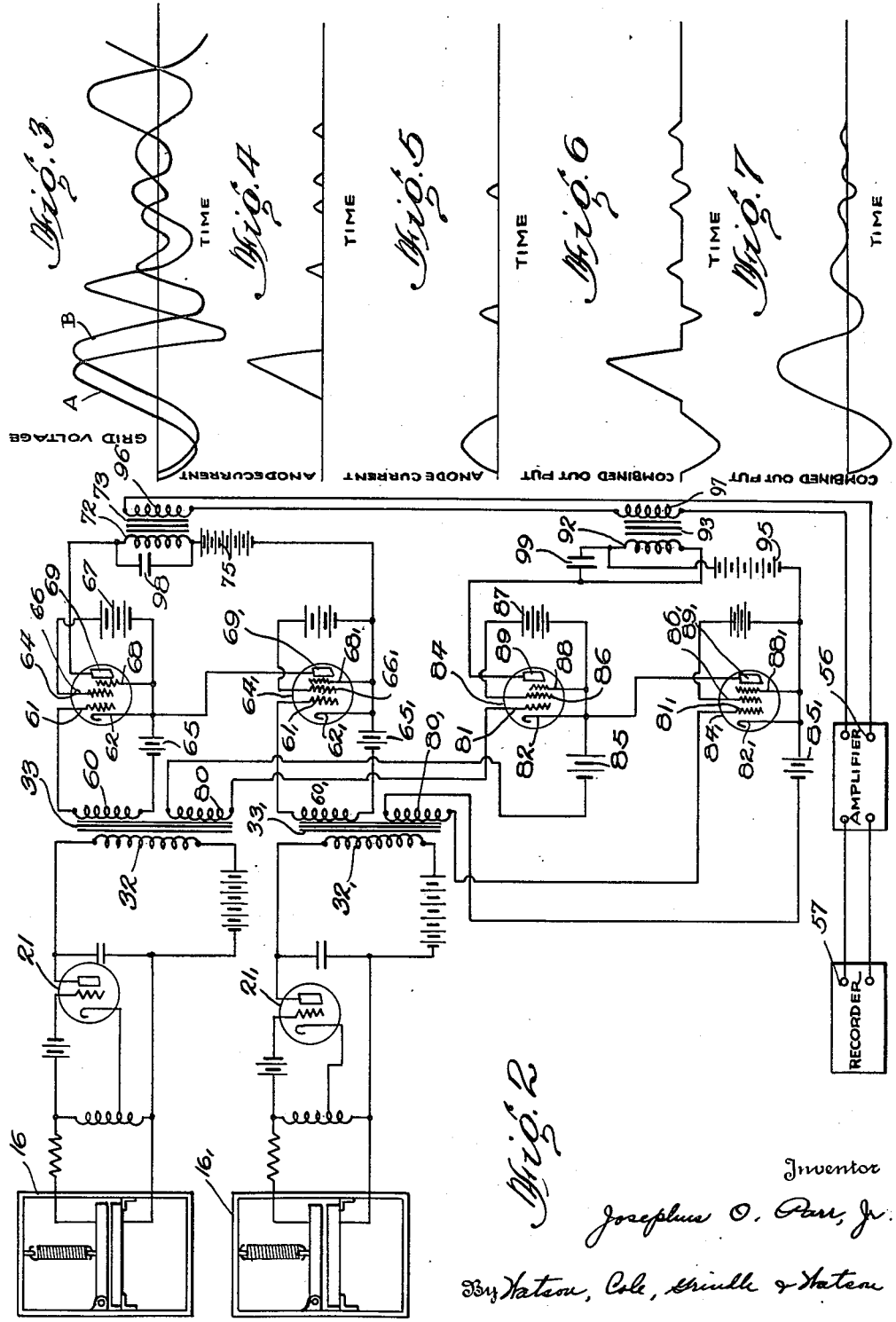

Patented June 16, 1942

2,286,567

UNITED STATES PATENT OFFICE 2,286,567

SEISMIC SURVEYING

Josephus O. Parr, Jr., San Antonio, Tex., assignor to Olive S. Petty, San Antonio, Tex.

Application September 12, 1940, Serial No. 356,543

10 Claims. (Cl. 177—352)

This invention relates to seismic apparatus and methods for use in geological surveying. It is the principal object of the invention to provide improved equipment from which may be derived a record of seismic impulses which may be more readily interpreted and in which the more significant impulses are emphasized.

It is well recognized that reasonably accurate mapping of geological formations can be effected by creating seismic waves near the earth's surface and determining at one or more remote points the lapse of time required to enable the waves to reach such points. The customary procedure is to fire a charge of explosive on or at a suitable distance below the surface of the earth at a position commonly referred to as a "shot point," and to detect or receive the resulting direct, reflected, and refracted seismic waves at remote points where they are converted into wave-form electrical energy. Suitable apparatus is then employed to record the fluctuations of this electrical energy in permanent form for study.

Conventional equipment for recording the seismic waves includes the use at the receiving point of a device sometimes referred to as a seismometer for effecting conversion of the seismic impulses into electrical energy. These devices usually comprise a relatively stationary member, sometimes called a steady mass, and a part which is movable with the earth and with respect to the steady mass, these parts supporting electrical elements relatively movable thereby, whereby electrical energy is generated or varied in accordance with variation in amplitude and frequency of the incoming seismic impulses. The electrical output from such a seismometer is customarily amplified with suitable equipment and fed into a recorder, usually a galvanometer having a moving element, the motion of the element being recorded by suitable optical means on a photographic sheet which is moved by clockwork at a substantially fixed rate. The sheet also bears time intervals which are recorded thereon by a suitable timing device associated with the recorder.

It is customary to employ a considerable number of seismometers, for example eight or nine, located at different distances from the shot point, and to separately amplify and record the energy output of these seismometers so that the time of arrival of the seismic impulses at the various points may be determined. In the practice of the present invention, these seismometers may be arranged in groups, or each of the usual seismometers may be replaced by a group, or two or more seismometers, and the energy output of the several seismometers in each group is dealt with in such a way as to eliminate largely or entirely from the record that portion of the received energy which represents undesired or unnecessary impulses or disturbances.

It has heretofore been proposed, in an effort to reduce the effect of undesired waves propagated generally horizontally, to effect suitable spacing of a plurality of seismometers and to directly combine the outputs of these seismometers. For example, if two seismometers are spaced, as measured in the direction of propagation of such undesired waves, by one-half of the wave length thereof, the energy output of the two seismometers will theoretically be 180° out of phase, so that the combined outputs will cancel and the effect of such waves on the record will be substantially eliminated. This method would be reasonably satisfactory if the undesired energy were derived from a single source and if the ground were quite homogeneous, since the undesired energy would then have a definite frequency, wave length, etc., and multiple detectors could be spaced so as to achieve the desired result. Unfortunately, however, in most locations, neither the surface nor the sub-surface is homogeneous, and furthermore, there are various sources of waves, as well as paths for the same, which tend to mar, distort, or make the record unintelligible. Each of these different waves, paths, or sources is likely to set up waves of different frequencies, wave length, and direction of propagation, and a multiple spacing affording the proper interval to effect cancellation of all undesired energy is impossible. Thus, if four seismometers are spaced in the manner heretofore proposed, it is highly probable that in many instances the output of two of the seismometers would actually cancel, the output of a third would be zero, and the fourth seismometer would receive a considerable amount of unwanted energy. The sum of the energy outputs of the four seismometers would then be representative of the unwanted energy received by the fourth seismometer.

In accordance with the present invention, it is proposed to so treat the energy derived from the several seismometers of a group as to substantially eliminate response from waves traveling in the earth's upper crust, even though the spacing of the several seismometers is irregular and wholly independent of wave length. Thus in a group including, for example, four seismometers, the arrangement is such that there will be no response to seismic impulses unless and until all of the seismometers of the group are at a given instant undergoing displacement in one direction.

It will be appreciated that with such an arrangement the response to random energy is also materially reduced or eliminated, since it is highly unlikely in a system employing a number of seismometers that random energy will be received at the several seismometers in the same direction, regardless of the arrangement of the seismometers with respect to each other or with respect to the source of the desired seismic impulses.

More specifically, it is an object of the instant invention to provide, in combination with a plurality of seismometers, a plurality of thermionic valves, the control grid of each valve being supplied with energy from one only of the seismometers, the valves being arranged in series with the anode of one valve connected to the cathode of the succeeding valve, the valves being biased to the point of cut-off or beyond cut-off. Thus, unless there is simultaneously applied to the control grid of each of the valves a positive signal charge, no current will flow in the valve circuit, and the current flowing in the circuit at any instant will be limited in amplitude to an extent determined by the smallest positive signal charge applied to any one of the valves.

It will be appreciated that with such an arrangement, seismic impulses arriving 180° out of phase at the several seismometers of the group will not be transmitted through the valve circuit and will not be recorded. Furthermore, unless the phase relation of the seismic energy arriving at any instant at the several seismometers of the group is such that a positive signal charge is simultaneously applied to all of the valves in the circuit, no current will flow in the circuit at that instant. Thus the record of seismic energy which is out of phase to any extent at the several seismometers will be recorded, if at all, at a relatively low amplitude level. Again, by the employment of the circuit just described, the effect of random energy will be rendered negligible or altogether eliminated.

Further objects and features of the invention will be apparent from the following description taken in connection with the accompanying drawings, in which—

Figure 2 is a similar diagram illustrating a further method of applying the invention; and Figures 3 to 7 inclusive represent curves illustrating the function of the circuit shown in Figure 2.

Figure 1:
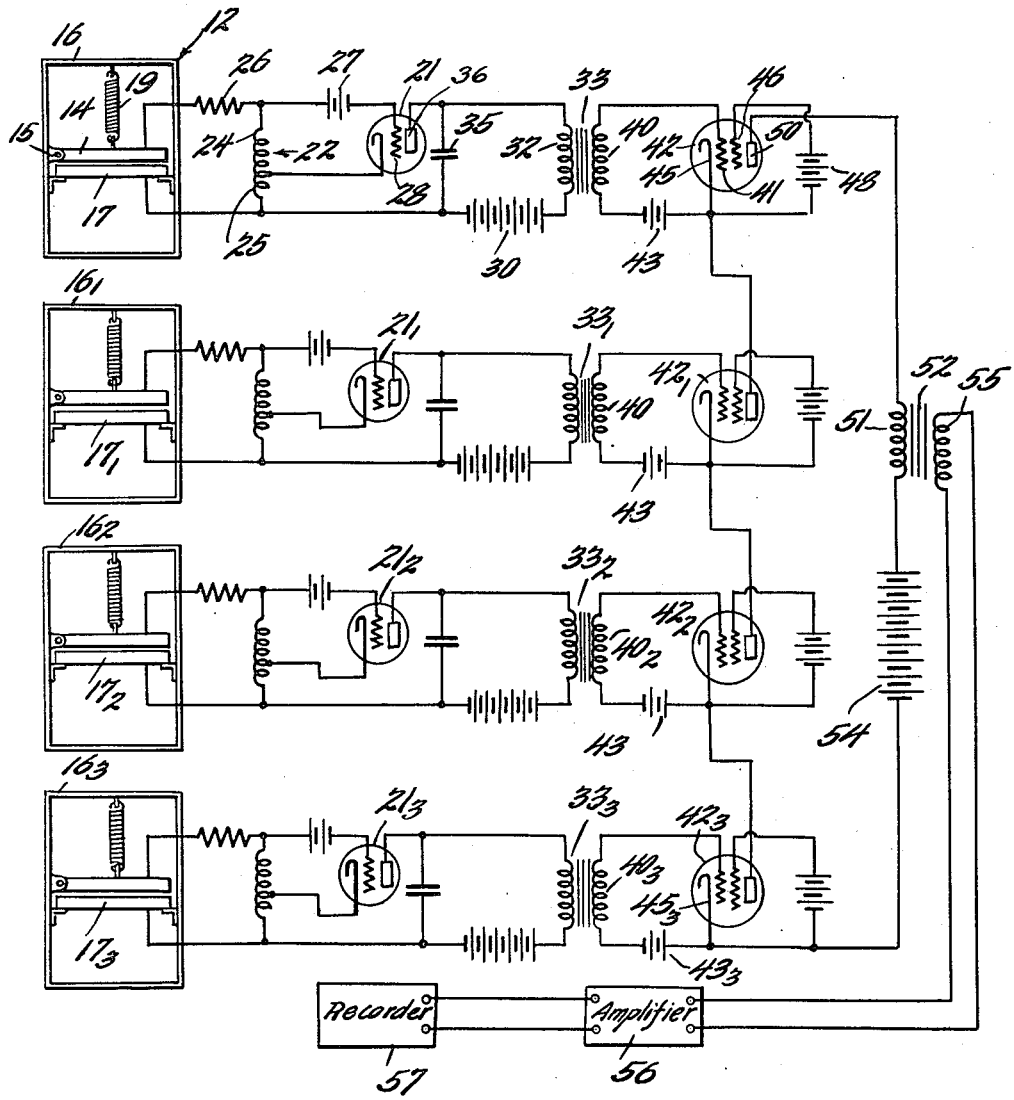
Figure 1 is a circuit diagram illustrating one form of seismic apparatus employing the principle of the instant invention.

In order to facilitate an understanding of the invention, reference will be made to the embodiment thereof illustrated in the accompanying drawings and specific language will be employed. It will nevertheless be understood that various further modifications of the device illustrated herein, such as would fall within the province of those skilled in the art to construct, are contemplated as part of the present invention.

Figure 1 of the drawings illustrates an electrical circuit embodying the principles of the invention and disclosing a plurality of seismometers having similar electrical circuits associated therewith. Since these circuits are duplicated, the first seismometer and its associated circuit will be particularly referred to herein, the same reference numerals with distinguishing subscripts being employed to designate corresponding elements in the successive circuits.

At 12 is diagrammatically represented a detector unit or seismometer of the so-called capacitive type, the essential elements of which comprise a movable plate 14, which may be hingedly supported at 15 on the casing 16, and a plate 17 which is fixed in the casing. A spring 19, connected between the movable plate 14 and the upper portion of the casing 16, constitutes with the plate 14 an elastic system, the plate being permitted to swing about its point of pivotal support and toward and away from the fixed plate 17, whereby the two plates function as a condenser of which the capacity is varied on vertical displacement of the casing 16.

It will be appreciated that the details of the structure thus far described form no part of the instant invention, and that the showing is wholly diagrammatic. Any suitable form of seismometer may be employed for the purpose. For example, the seismometer may be constructed in accordance with that disclosed in the application of Olive S. Petty, Serial No. 324,013, filed March 14, 1940.

The plates 14 and 17 are incorporated in the oscillating circuit of a thermionic valve 21, the circuit also including an intermediate tapped inductance coil 22 having a portion 24 which may be described as a grid winding and a portion 25 which may be described as an anode winding. The grid winding 24 is electrically connected at its outer end through resistance 26 with plate 14 and is further connected through a source of grid bias 27 to the grid 28 of the valve 21. The outer end of the anode winding 25 is electrically connected to the plate 17 and is further connected to the anode 36 of the valve 21 through a source of anode voltage 30 and the primary winding 32 of a transformer 33. A condenser 35 is arranged in shunt with the transformer winding and the source of anode voltage 30.

In operation, the circuit just described will oscillate at a frequency which is dependent upon the characteristics of the various elements included therein. The inductance of the two parts of the coil 22, the value of the resistance 26, and other parts of the circuit are appropriately selected to provide a convenient resonance frequency for any desired spacing of the plates 14 and 17. Means may be provided to adjust the spacing between these plates to afford the desired frequency of oscillation, so that thereafter, with all of the other elements of the circuit remaining constant, any variation in the spacing of the plates will cause corresponding changes in the oscillation frequency. When the plates are in repose, a pulsating, direct current of fixed frequency flows in the anode circuit of the valve, and there is present in the grid winding 24 a high frequency alternating current of fixed amplitude. The changes in frequency of oscillation brought about by relative movement of the plates 14 and 17 alter the current flow in the anode circuit of the valve, as more particularly described in the application of Olive S. Petty, hereinbefore mentioned. Preferably the natural frequency of the elastic system constituted by the movable plate 14 and the supporting spring 19 is relatively low, so that on the occurrence of seismic impulses, the plate 14 occupies substantially a fixed position in space, the casing 16 and plate 17 moving with respect to the plate 14 so that the extent of relative displacement of the plates is a measure of the absolute displacement of the casing.

As hereinbefore indicated, the electrical waveform energy derived from each of the seismometers is fed to a separate thermionic valve, these valves being arranged in series for the stated purpose. Thus the secondary winding 40 of the transformer 33 is connected at one end to the control grid 41 of a valve 42 and through a source 43 of grid bias voltage to the cathode 45 of the valve. A high voltage grid 46 is preferably included, this grid being connected to the cathode 45 through a high voltage source 48. The anode 50 of the first valve 42 of the series is connected through the primary winding 51 of an output transformer 52 and through a source 54 of anode voltage to the cathode $45_3$ of the last valve $42_3$ of the series. The anode of each valve except the first is then connected to the cathode of the preceding valve, so that the space discharge paths of the valves are in series in a common circuit; for convenience in terminology the valves may be said to be arranged in series. The output of the secondary winding 55 of the transformer 52 is fed to an amplifier 56 of conventional design and thence to a recorder 57, preferably of the string galvanometer type.

The control grids 41 of the valves 42 are supplied with a large negative bias, so that each valve is biased at least to the point of cut-off or beyond cut-off. Thus when seismic impulses are received at any one of the seismometers, an alternating signal voltage will be applied to the control grid 41 of the associated valve 42, and on the positive swing of the signal voltage, the grid may be rendered sufficiently positive to permit current flow between the cathode and the anode. However, unless the grids of all of the valves $42$—$42_3$ are simultaneously rendered sufficiently positive to permit of the passage of electrons from the cathode to the anode, no current will flow in the primary winding 51 of the transformer 52. Signals arriving substantially in phase at each of the seismometers of the group will energize the transformer 52 during the positive swing of the signal voltage, and such in-phase seismic impulses will therefore be duly amplified and recorded.

Thus the seismic impulses resulting from upward refraction or reflection from deeper strata are reproduced, whereas generally horizontally traveling impulses and stray impulses which do not result in simultaneous displacement of all of the seismometers of the group in one direction will not be transmitted through the thermionic valve circuit and will thus not be reproduced.

Figure 2 represents an arrangement whereby a record is made of impulses effecting concurrent displacement of the seismometers in both directions, and since many of the elements of Figure 1 are duplicated, similar reference numerals are employed to designate these duplicated elements. For convenience, only two seismometers are shown, but it will be appreciated that any desired number may be employed in any one group.

Thus the seismometers 16 and $16_1$ are associated with oscillating circuits including valves 21 and $21_1$ respectively, the outputs of these circuits being delivered to the primary windings 32 and $32_1$ of the respective transformers 33 and $33_1$. The secondary winding 60 of transformer 33 is connected to the control grid 61 and the cathode 62 of a thermionic valve 64, the valve being biased to cut-off or beyond by a source 65 of grid bias voltage. A high voltage grid 66, connected to the cathode through a voltage source 67, and a suppressor grid 68, which may be connected to the cathode, are preferably employed. The anode 69 of valve 64 is connected through the primary winding 72 of a transformer 73 and through a source of anode voltage 75 to the cathode $62_1$ of a valve $64_1$, the grid $61_1$ of which is supplied with control voltage from the secondary winding $60_1$ of transformer $33_1$. The anode $69_1$ of valve $64_1$ is connected to the cathode 62 of valve 64, as in the form of the invention shown in Figure 1. The valve $64_1$ preferably includes high and low voltage grids $66_1$ and $68_1$ respectively, and is biased to cut-off or beyond by a source $65_1$ of grid bias voltage. The circuit including the valves 64 and $64_1$ will thus supply current to the primary winding 72 of the transformer 73 only during periods of application of positive grid swing to both valves. When the grid swing of both valves 64 and $64_1$ is negative, a second circuit which likewise contains two thermionic valves in series is caused to deliver output energy.

Thus the transformers 33 and $33_1$ are provided with further secondary windings indicated respectively at 80 and $80_1$. The secondary winding 80 is connected to the control grid 81 and the cathode 82 of a thermionic valve 84, the valve being biased to cut-off or beyond by a source 85 of grid bias voltage. A high voltage grid 86, connected to the cathode through a voltage source 87, and a suppressor grid 88, which may be connected directly to the cathode, are preferably employed. The anode 89 of valve 84 is connected to the primary winding 92 of a transformer 93 and through a source of anode voltage 95 to the cathode $82_1$ of a valve $84_1$, the grid $81_1$ of which is supplied with control voltage from the secondary winding $80_1$ of transformer $33_1$. The anode $89_1$ of valve $84_1$ is connected to the cathode 82 of valve 84. The valve $84_1$ preferably includes high and low voltage grids $86_1$ and $88_1$ respectively, and is biased to cut-off or beyond by a source $85_1$ of grid bias voltage.

It will be noted that the connections between the secondary windings of the transformers 33 and $33_1$ and the several valves is such that control voltage is supplied in inverse phase to the grids of valves 84 and $84_1$. In other words, when the seismometers 16 and $16_1$ are so displaced as to apply a positive grid swing to valves 64 and $64_1$, a negative grid swing is simultaneously applied to valves 84 and $84_1$, and when the seismometers are both displaced in the opposite direction, the reverse is true, a positive grid swing being applied only to valves 84 and $84_1$. It will also be observed that the outputs of the two circuits, the first including the valves 64 and $64_1$, and the second including the valves 84 and $84_1$, are supplied to the transformers 73 and 93 in inverse phase relation. Thus when in-phase seismic impulses are arriving at the seismometers 16 and $16_1$, the two circuits will alternately deliver current to the transformers 73 and 93, and since the direction of the currents thus supplied are opposed, a more or less continuous waveform signal will be induced in the secondary windings 96 and 97 of the transformers 73 and 93. This current may be delivered to the amplifier 56 and thence to the recorder 57 as hereinbefore described.

The function of the system shown in Figure 2 is illustrated diagrammatically in Figures 3 to 7 inclusive. Thus in Figure 3, curves A and B represent respectively the variation with time of the control voltages applied to valves 64 and $64_1$ on the arrival of seismic waves at the seismometers 16 and 16₁. Whenever positive swings are simultaneously applied to the control grids, as represented by those periods during which curves A and B both lie above the zero axis, the output of the circuit containing these valves will be generally proportional to the less positive of the applied control voltages, as is diagrammatically represented in Figure 4.

During the periods in which the outputs of the oscillating circuits including valves 21 and 21₁ are such as to apply a negative swing to the valves of grids 64 and 64₁, so that no current flows in the circuit including these valves, a positive swing will be applied to the control grids of valves 84 and 84₁, and the response of the circuit including the latter valves may likewise be derived from Figure 3, and is shown in Figure 5. The outputs of the two circuits are then combined in opposed phase by means of the transformers 73 and 93, and by reversing Figure 5 and combining with Figure 4, we may obtain a representation (Figure 6) of the current flow in the output circuit including the secondary windings 96 and 97. In order that the amplifier and recorder may be supplied with energy of more nearly continuous wave-form, it may be desirable to shunt the primary windings 72 and 92 of transformers 73 and 93 with condensers 98 and 99, so as to obtain a smooth trace at the recorder which is approximately that represented in Figure 7. The effect of the present invention in discriminating between seismic impulses arriving in phase and out of phase, and the resultant simplification and improvement of the record for the purpose of interpretation is at once apparent from an inspection of this set of curves.

While it is desirable to employ pentode valves in the series circuits, it will be appreciated that other types of valve may be used. If triodes are employed, however, care must be taken to insure bias of the control grids thereof sufficiently beyond the cut-off point to enable any one valve to block the circuit even though the anode voltage applied to that valve is momentarily substantially increased by the application of a positive grid swing to the other valves of the series. Owing to the high plate resistance of pentode valves, a bias to the point of cut-off will ordinarily suffice.

It will be appreciated that widely varying types of seismometers may be employed. For example, I may use a magnetic type of seismometer such as shown more particularly in the copending application of Olive S. Petty, Serial No. 318,739, filed February 13, 1940. Since the capacitive type of seismometer requires the inclusion of the seismometer plates in an oscillating circuit, the plates alone being incapable of generating an alternating voltage, reference in the appended claims to a seismometer is intended to include, in the case of capacitive seismometers, the associated oscillating circuit.

In a broad sense, the instant invention contemplates the employment of a plurality of transducers for effecting electromechanical conversion of wave form energy, these transducers being arranged to transmit energy to an amplifying and recording means only when the energy applied to all of the transducers is in the same direction, and then as a function of the energy applied to that one of the transducers which is at the instant receiving the least energy.

Having thus described the invention, what is claimed as new and desired to be secured by Letters Patent is:

1. In apparatus for use in seismic surveying, the combination with a plurality of groups of seismometers, of a plurality of electrical circuits, each circuit including a plurality of thermionic valves, said valves in each of said circuits being biased to cut-off and being arranged in series in their respective circuits, the anode of each valve being connected to the cathode of an adjacent valve, and means feeding the output of the seismometers in each group to the respective valves of one of said circuits, and recording means operable by the output of each circuit for concurrently recording the outputs of said circuits on a common record sheet.

2. In apparatus for use in seismic surveying, the combination with a plurality of seismometers, of a circuit including a plurality of thermionic valves, said valves being biased to cut-off and being arranged in series in said circuit, the anode of each of said valves being connected to the cathode of an adjacent valve, and means feeding the output of each seismometer to one of said valves.

3. In apparatus for use in seismic surveying, the combination with a plurality of seismometers, of a circuit including a plurality of thermionic valves, said valves being arranged in series in said circuit, the anode of each of said valves being connected to the cathode of an adjacent valve, means feeding the output of each seismometer to one of said valves, and means applying to the grid of each of said valves a bias to cut-off, whereby energy is transmitted through said circuit only during simultaneous feeding to the grids of each of said valves of a positive signal charge.

4. In apparatus for use in seismic surveying, the combination with a plurality of seismometers having relatively movable elements and means converting the energy of such motion into waveform electrical energy, of energy transmitting means receiving electrical energy from all of said seismometers and transmitting energy only during simultaneous displacement of the moving elements of said seismometers in a direction such that the output voltages thereof are of the same sign, and recording means operable by energy transmitted by said last named means.

5. In apparatus for use in seismic surveying, the combination with a plurality of seismometers having relatively movable elements and means converting the energy of such motion into waveform electrical energy, of a recording device operable by the electrical energy output of said seismometers, and means blocking the delivery of the energy output to said recording device whenever the moving elements of all of said seismometers are not moving in a direction such that the output voltages thereof are of the same sign.

6. In apparatus for use in seismic surveying, the combination with a plurality of seismometers having relatively movable elements and means converting the energy of such motion into waveform electrical energy, of a recording device operable by the electrical energy output of said seismometers, and means blocking the delivery of the energy output to said recording device whenever the moving elements of all of said seismometers are not moving in a direction such that the output voltages thereof are of the same sign, said last named means comprising a thermionic valve circuit transmitting energy from said seismometers to said recording device.

7. In apparatus for use in seismic surveying, the combination with a plurality of seismometers having relatively movable elements and means converting the energy of such motion into waveform electrical energy, of a recording device operable by the electrical energy output of said seismometers, and means blocking the delivery of the energy output to said recording device whenever the moving elements of all of said seismometers are not moving in a direction such that the output voltages thereof are of the same sign, said last named means comprising a circuit including a plurality of thermionic valves, said valves being arranged in series in said circuit, the anode of each of said valves being connected to the cathode of an adjacent valve, means feeding the output of each seismometer to one of said valves, and means feeding the output of said circuit to said recording device.

8. In apparatus for use in seismic surveying, the combination with a plurality of seismometers, of two circuits, each circuit including a plurality of thermionic valves arranged in series in the circuit, means delivering the output of each seismometer to one of said valves in one circuit and, in inverse phase relation, to one of said valves in the other circuit, and means combining the outputs of said circuits in inverse phase relation.

9. In apparatus for use in seismic surveying, the combination with a plurality of seismometers, of two circuits, each circuit including a plurality of thermionic valves arranged in series in the circuit, means delivering the output of each seismometer to one of said valves in one circuit and, in inverse phase relation, to one of said valves in the other circuit, means applying to the grid of each of said valves a bias to cut-off, whereby energy is transmitted through either circuit only during simultaneous feeding to the grids of the valves therein of a positive signal charge, and means combining the outputs of said circuits in inverse phase relation.

10. In apparatus for use in seismic surveying, the combination with a plurality of seismometers having relatively movable elements and means converting the energy of such motion into waveform electrical energy, of energy transmitting means receiving electrical energy from all of said seismometers and transmitting energy only during simultaneous displacement of the moving elements of said seismometers in a direction such that the output voltages thereof are of one sign, further energy transmitting means receiving electrical energy from all of said seismometers and transmitting energy only during simultaneous displacement of said seismometers in a direction such that the output voltages thereof are of another sign, means combining the outputs of said energy transmitting means in opposed phase, and recording means operable by such combined energy.

JOSEPHUS O. PARR, JR.